US006767633B2

(12) United States Patent
Steudel et al.

(10) Patent No.: US 6,767,633 B2
(45) Date of Patent: Jul. 27, 2004

(54) TRANSPARENT MEDIUM HAVING ANGLE-SELECTIVE TRANSMISSION OR REFLECTION PROPERTIES AND/OR ABSORPTION PROPERTIES

(75) Inventors: Elke Steudel, Darmstadt (DE); Hans-Dieter Brückner, Darmstadt (DE); Gerhard Pfaff, Muenster (DE); Peter Reynders, Griesheim (DE); Christoph Schmidt, Kriftel (DE); Carsten Brabänder, Hoechst (DE); Wolfgang Hechler, Lautertal (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 10/257,251

(22) PCT Filed: Mar. 20, 2001

(86) PCT No.: PCT/EP01/03159

§ 371 (c)(1),
(2), (4) Date: Oct. 10, 2002

(87) PCT Pub. No.: WO01/77235

PCT Pub. Date: Oct. 18, 2001

(65) Prior Publication Data

US 2003/0092815 A1 May 15, 2003

(30) Foreign Application Priority Data

Apr. 11, 2000 (DE) .......................................... 100 17 960
Apr. 14, 2000 (DE) .......................................... 100 18 904

(51) Int. Cl.[7] ............................. B32B 19/00; C09C 1/36
(52) U.S. Cl. ....................... 428/357; 428/403; 428/699; 428/701; 428/702; 106/415; 106/436; 106/439; 106/453; 106/454; 106/456; 106/480

(58) Field of Search .................................. 428/357, 363, 428/402, 403, 688, 689, 699, 701, 702; 282/582–589; 106/415, 417–418, 428, 430, 436, 439, 435, 446, 453–454, 456, 480

(56) References Cited

U.S. PATENT DOCUMENTS

| 4,198,796 A | * | 4/1980 | Foster ......................... 52/203 |
| 5,364,467 A | * | 11/1994 | Schmid et al. .............. 106/404 |
| 5,972,098 A | * | 10/1999 | Andes et al. ................ 106/436 |
| 6,019,831 A | * | 2/2000 | Schmidt et al. ............. 106/417 |
| 6,156,115 A | * | 12/2000 | Pfaff et al. .................. 106/403 |
| 6,280,520 B1 | * | 8/2001 | Andes et al. ................ 106/415 |
| 6,284,032 B2 | * | 9/2001 | Andes et al. ................ 106/436 |
| 6,517,628 B1 | * | 2/2003 | Pfaff et al. .................. 106/417 |

FOREIGN PATENT DOCUMENTS

| DE | WO 9931023 | * | 6/1999 |
| JP | 2000-239559 | * | 9/2000 |

OTHER PUBLICATIONS

DE 198 56 171 A (Merck Patent) Jun. 24, 1999.
Database WPI Section Ch, Week 199903 Derwent Publications Ltd., London, GB; XP002177628 & JP 10 290635 A (DAIO KASEI KK), Nov. 4, 1998.

* cited by examiner

Primary Examiner—Deborah Jones
Assistant Examiner—G. Blackwell-Rudasill
(74) Attorney, Agent, or Firm—Millen, White, Zelano, Branigan, P.C.

(57) ABSTRACT

The invention relates to a transparent medium comprising multilayer pigments having angle-selective reflection or transmission properties and/or absorption properties, and to their use, in particular in transparent thermal insulation systems (TTIs).

15 Claims, No Drawings

TRANSPARENT MEDIUM HAVING ANGLE-SELECTIVE TRANSMISSION OR REFLECTION PROPERTIES AND/OR ABSORPTION PROPERTIES

The invention relates to the use of multilayer pigments in transparent media which are distinguished by the fact that they have angle-selective transmission or reflection properties and/or absorption properties.

The sun is an inexhaustible, environmentally friendly energy source which provides us with potential energy for heating buildings. Overall, four times as much energy is radiated onto a building as is consumed in heating energy inside.

Transparent thermal insulation (TTI) is a technology for solar room heating. The materials involved here combine low thermal conductivity with a high degree of transmission for solar radiation. In the case of an outside wall with transparent thermal insulation, a TTI element is located in front of a solid wall to which a black or coloured absorber layer has been applied. The incident solar energy is guided by this system from the outside of a building wall through a glass tube system, hits the wall formers and is converted into heat. Although the TTI systems employed at present give good thermal insulation and also energy recovery in winter, the way they function means that they result in overheating of the wall in summer and in unpleasant inside wall temperatures if mechanical shading systems, such as, for example, roller blinds, venetian blinds, slats, extractors, etc., are not available. In addition, the black absorber layers necessary for absorption of the energy represent a decorative restriction in the design of building walls.

Through application of transparent thermal-insulation modules to south-facing walls, solar energy can be introduced into a building to an increased extent and utilized for heating. This effect is very welcome in winter, but in summer additionally introduced heat results in overheating of the building.

The solar radiation hitting a building wall changes its angle of incidence depending on the time of day and on the season (winter/summer). In winter, the angle of incidence onto a south-facing wall with the sun at its highest point (12.00 hours) is about 12°, while in summer it is about 68° in Germany (depending on the latitude).

DE-A-195 01 114 discloses a process which includes the direct and diffuse solar radiation present in winter into the heat balance of a house in a positive manner by simple measures. The prior art describes a paint which reflects in the visible region of the electromagnetic spectrum and can be rendred absorbent in the near infrared region with the aid of a pigment mixture. In contrast to the present invention, only the solar radiation present in winter has a positive effect on the heat balance of a house in DE-A-195 01 114. However, it is disadvantageous here that the much more intense solar radiation in spring, summer and autumn can result in overheating of the house, which can only be countered by ventilation.

The pigmented transparent medium disclosed in DE 197 56 037 A1 has solved this problem by not only utilizing the solar radiation in winter, but also protecting buildings against overheating in summer. To this end, overheating of buildings and rooms is prevented using pigments with angle-selective transmission, such as, for example, pearlescent pigments. The solar radiation in the wavelength range 0.25–2.5 $\mu$m is transmitted by a pigmented area to a lesser extent in summer with the sun high in the sky than in the winter months with the sun low. The transmission properties of the pearlescent pigments are determined by the refractive index and absorption properties of the coating materials, the layer thicknesses and the layer-sequence.

The object of the present invention is to significantly increase the efficiency of angle-selective shading of the TTI.

Multilayer pigments are not only of interest due to their colouring properties, but also are increasingly being used in functional areas. Multilayer pigments exhibit selective reflection or transmission in the visible wavelength range, properties which are responsible for the colour impression. This wavelength-dependent reflection or transmission can be extended to the near infrared region and is partially utilized in agricultural sheeting. On the other hand, multilayer pigments exhibit different reflection or transmission and absorption depending on the angle of incidence of the incident radiation. A completely new functional area of application for multilayer pigments should thus be found in the construction sector in the design of building walls.

The angle dependence of the optical properties can be increased through a suitable choice and combination of coating materials of different refractive index. The wavelengths of maximum transmission of the pigments and maximum solar energy ideally coincide in the case of perpendicular solar radiation, while the maxima are shifted significantly with respect to one another in the case of flat incidence, i.e. for angles greater than 60° from the perpendicular. The ratio between the degrees of transmission at angles of incidence of 0° and 60° can thus be reduced from 0.6 for conventional pearlescent pigments to 0.1 for ideal multilayer pigments.

Surprisingly, it has been found that on use of multilayer pigments, a considerably greater shading effect can be achieved than in the case of conventional pearlescent pigments. Through a suitable combination of a plurality of layers, the angle-dependent transmission behaviour of the pigments can be reinforced and matched to the requirements of the particular building wall. The use of multilayer pigments enables the ratio between solar transmission in winter and summer to be reduced from 0.5–0.85 for conventional pearlescent pigments to 0.1–0.6 for multilayer pigments.

On corresponding application of these multilayer pigments to a building wall, transmission of solar radiation, i.e. warming of the building wall, can be achieved in winter, while reflection/absorption of the solar radiation, i.e. shading of the building wall, can be achieved in summer.

The invention thus relates to transparent media comprising multilayer pigments based on platelet-form substrates having angle-selective reflection or transmission properties and/or absorption properties, characterised in that the ratio between the degree of solar transmission in summer (angle of incidence of the solar radiation from 55 to 70°) and the degree of solar transmission in winter (angle of incidence of the solar radiation from 5 to 20°) is in the range 0.1–0.6.

The angle-selective properties of the multilayer pigments in the transparent media are concentrated on the spectral region of solar radiation, i.e. from 0.25 to 2.5 $\mu$m. In this wavelength range, the directed hemispherical degree of transmission and reflection can be measured, for example on glass substrates to which the functional pigments have been applied. From these measured directed hemispherical degrees of transmission and reflection, solar or visual degrees of transmission and reflection can be calculated in accordance with DIN 67507 by weighting with the solar spectrum or the brightness sensitivity of the human eye.

All multilayer pigments known to the person skilled in the art which have angle-selective reflection or transmission properties and absorption properties and whose ratio between the degree of solar transmission in summer (angle of incidence of the solar radiation from 55 to 70°) and the degree of solar transmission in winter (angle of incidence of the solar radiation from 5 to 20°) is in the range from 0.1 to 0.6, preferably less than 0.5, in particular from 0.3 to 0.5, are suitable in the present invention.

In order to support the angle-selective transmission or reflection properties and/or absorption properties of the functional multilayer pigments, it is advisable to apply the platelet-form pigments to a structured substrate or to incorporate them into a structure-forming medium, which in turn specify the orientation of the platelets. Given appropriate alignment of the pigment platelets, the angle-selective effect is reinforced effectively. The structuring can be achieved, for example, by applying the pigmented transparent medium to an embossing film or embossing the transparent medium itself or by admixing structure-forming additives with the transparent medium.

The angle-selective properties of the functional pigments are only evident in the transparent medium, such as a glass frit or a screen-printing medium, if the pigment is employed in amounts of from 5 to 70% by weight, preferably from 10 to 50% by weight, in particular from 30 to 40% by weight. However, the use concentration is dependent on the transparent medium used. In the case of water-borne coating systems and paint systems, the use concentration, based on the coating or paint, is preferably from 1 to 20% by weight, in particular from 3 to 15% by weight.

The multilayer pigments are incorporated into a transparent medium and subsequently applied to a transparent substrate or incorporated into a transparent medium, such as, for example, plastic. In order to reinforce the angle-dependent effect, the substrate or the pigmented layer may be or have been embossed. The shading modules obtained in this way are fixed to building walls, which may carry TTI modules.

The multilayer pigments, disclosed, for example, in DE-A 196 18 563, DE-A 196 18 566, DE-A 196 18 569, DE-A 197 07 805, DE-A 197 07 806, and DE-A 197 46 067, are based on a platelet-form, transparent, coloured or colourless matrix consisting, for example, of mica (synthetic or natural), $SiO_2$, glass, $TiO_2$, graphite or $Al_2O_3$ platelets and generally have a thickness of between 0.3 and 5 $\mu$m, in particular between 0.4 and 2.0 $\mu$m. The extent in the other two dimensions is usually between 1 and 250 $\mu$m, preferably between 2 and 100 $\mu$m, and in particular between 5 and 40 $\mu$m. The multilayer pigments consist of the matrix (substrate) coated with coloured or colourless metal oxides (at least 2), rare-earth metal sulfides, such as, for example, $Ce_2S_3$, oxysulfides or metal sulfides. The coating of the substrate platelets with a plurality of layers is carried out in such a way that a layer structure consisting of alternating layers of high and low refractive index is formed. The multilayer pigments preferably comprise 2, 3, 4, 5, 6 or 7 layers, in particular 3, 4 or 5 layers. Suitable metal oxides of high refractive index are, for example, titanium dioxide, zirconium oxide, zinc oxide, cerium oxide, iron oxides ($Fe_2O_3$ or $Fe_3O_4$), iron/titanium oxides (iron titanates) and/or chromium oxide, BiOCl, FeO(OH), spinels, titanates, aluminates, chromates, tungsten bronzes, tin oxides (also doped), or nitrides, for example TiN, in particular $TiO_2$ and/or $Fe_2O_3$. The doped tin oxides are preferably tin oxide which has been provided with antimony, fluorine and/or phosphorus in amounts of from 0.5 to 15% by weight, based on doped Sn. Particular preference is given to $(Sn,Sb)O_2$. The metal oxides of low reflective index used are $SiO_2$ and $Al_2O_3$. Also suitable are $MgF_2$, organic polymers (for example acrylates), $B_2O_3$, zeolites or borosilicates. The coating of the substrate platelets can be carried out, for example, as described in WO 93/08237 (wet-chemical coating) or DE-A 196 14 637 (CVD method).

If desired, a transparent substrate can take on an optical function of the multilayer system, in particular if the substrate is $SiO_2$ or $Al_2O_3$.

Preferred multilayer pigments have the following layer structure:

Substrate+$Fe_2O_3$+$SiO_2$+$Fe_2O_3$
Substrate+$Fe_2O_3$+$SiO_2$+$TiO_2$
Substrate+$TiO_2$+$SiO_2$+$Fe_2O_3$
Substrate+$TiO_2$+$SiO_2$+$TiO_2$/$Fe_2O_3$
Substrate+$TiO_2$/$Fe_2O_3$+$SiO_2$+$TiO_2$/$Fe_2O_3$
Substrate+$TiO_2$+$SiO_2$+$Cr_2O_3$
Substrate+$TiO_2$+$SiO_2$+$TiO_2$
Substrate+$TiO_2$+$SiO_2$+$TiO_2$+$SiO_2$
Substrate+$TiO_2$+$TiO_2$/$Fe_2O_3$+$SiO_2$+$TiO_2$+$TiO_2$/$Fe_2O_3$
Substrate+$(Sn,Sb)O_2$+$TiO_2$
Substrate+$(Sn,Sb)O_2$+$SiO_2$
Substrate+$SnO_2$+Ag+$NiCrO_x$+$SnO_2$
Substrate+$TiO_2$+ZnO+Ag+$NiCrO_x$+$Si_3N_4$
Substrate+$TiO_2$+$SiO_2$+$TiO_2$+$FeTiO_3$
Substrate+$TiO_2$+$SiO_2$+$FeTiO_3$ Substrate+$TiO_2$+$FeTiO_3$+$SiO_2$+$TiO_2$+$FeTiO_3$ Instead of the outer metal-oxide layer, it is also possible to use a semi-transparent layer of a metal. Suitable metals for this purpose are, for example, Cr, Ti, Mo, W, Al, Cu, Ag, Au or Ni.

In order to achieve specific colour effects, finely divided particles having a size in the nanometer region can additionally be introduced into the layers of high or low refractive index. For example, finely divided $TiO_2$ or finely divided carbon (carbon black) having particle sizes in the range 10–250 nm prove suitable for this purpose. The gloss and hiding power can be influenced specifically by means of the light-scattering properties of particles of this type.

The multilayer pigments can also be provided with a protective layer in order to improve the light, weather and chemical stability or to increase the compatibility in various media. Suitable post-coatings or post-treatments are, for example, the methods described in DE 22 15 191, DE 31 51 354, DE 32 35 017 or DE 33 34 598. The substances additionally applied make up only from about 0.1 to 5% by weight, preferably from 0.5 to 3.0% by weight, of the multilayer pigment.

The transparent medium according to the invention may also comprise a mixture of different multilayer pigments, since the use of at least two different pigments frequently enables particular effects to be achieved. The pigments are then miscible in any ratio, but the total content of all functional pigments in the transparent medium should not exceed 70% by weight.

It goes without saying that the multilayer pigments can also advantageously be used in blends with organic dyes, inorganic pigments or other pigments, such as, for example, transparent and opaque white, coloured and black pigments, and with platelet-form iron oxides, organic pigments and conventional transparent, coloured and black gloss pigments based on metal oxide-coated mica, $SiO_2$, $Al_2O_3$ or glass platelets, etc. The multilayer pigments can be mixed with the commercially available pigments and fillers in any ratio.

Suitable transparent media are, in particular, glass, paints, water-borne coatings and plastics, in particular plastic films. The transparent medium is preferably glass or a transparent polymer.

The binders employed are conventional paint binders, such as, for example, polyurethane-acrylate resins, acrylate-melamine resins, alkyd resins, polyester resins and epoxy resins, hydrocarbon resins, nitrocellulose, nitrocellulose derivatives, cellulose acetopropionate and -butyrate, ketone resins, aldehyde resins, polyvinylbutyral, α-methylstyrene-acrylonitrile copolymers, polyesterimide, acrylate resin based on butyl acrylate, polyacrylates, in particular polybutyl acrylate, an aqueous dispersion based on polyethylene, an aqueous dispersion based on polyethylene oxide, an aqueous dispersion based on ethylene-acrylic acid copolymers, an aqueous dispersion based on methacrylate, on acrylate/styrene, a vinylpyrrolidone-vinyl acetate copolymer, or, however, a mixture of the said dispersions and binders.

The formulation is generally prepared by initially introducing one or more multilayer pigments and mixing them homogeneously with the binder and any non-opaque additives. The pigmented coating can subsequently be applied, for example, to glass plates, aluminium sheeting or steel sheeting, for example by dipping, brushing, knife coating, printing, spraying, etc.

The pigmented coating is subsequently baked at temperatures of 100–800° C., depending on the coating system. In the case of water-borne coating systems, the baking process is preferably carried out at temperatures of 100–250° C.

The functional pigment or pigment mixture can furthermore also be applied in dry form to a substrate, for example a thermoplastic. The substrate is then melted, and the pigment is homogeneously distributed in the transparent medium.

Suitable transparent media are all thermoplastics known to the person skilled in the art, as described, for example, in Ullmann, Vol. 15, pp. 457 ff., Verlag VCH. Examples of suitable plastics are polyethylene, polypropylene, polyamides, polyesters, polyester-esters, polyether-esters, polyphenylene ether, polyacetal, polybutylene terephthalate, polymethyl methacrylate, polyvinylacetal, polystyrene, polyurethanes, acrylonitrilebutadiene-styrene (ABS), acrylonitrile-styrene-acrylate (ASA), polycarbonate, polyether sulfones, polyether ketones and copolymers and/or mixtures thereof.

The incorporation of the multilayer pigments into the plastic is carried out by mixing the plastic granules with the pigment and then shaping the mixture with exposure to heat. The preparation of the plastic granules/pigment mixture is general carried out by introducing the plastic granules into a suitable mixer, wetting them with any additives and then adding and incorporating the pigment. The pigmentation of the plastic is generally carried out via a colour concentrate (masterbatch) or compound. The mixture obtained in this way can then be processed directly in an extruder or injection-moulding machine. The mouldings formed on processing, such as, for example, plastic sheets, exhibit a very homogeneous distribution of the pigment.

Furthermore, the pigments can be incorporated into glass or ceramics. In this case, the multilayer pigments are mixed with the glass or ceramic frits under mild conditions, the powder mixture is applied to a substrate and baked for from 5 to 60 min., preferably for from 5 to 30 min., in particular for from 5–20 min., at temperatures of 150–1100° C., preferably at 400–850° C.

The medium according to the invention can be applied to any desired substrate materials, for example metals, such as, for example, iron, steel, aluminium, copper, bronze, brass and metal foils, but also metal-coated surfaces of glass, ceramic, concrete, packaging materials, films or to other materials for shading and at the same time decorative purposes. The use of functional multilayer pigments has proven extremely effective, in particular, in the area of so-called transparent thermal insulation (TTI) of building walls.

The invention likewise relates to TTI systems which comprise coloured absorber layers in combination with angle-selective shading glass coatings.

The transparent media according to the invention are of considerable economic importance with respect to energy saving and thus conservation of resources, in particular through their use in transparent thermal insulation (TTI),.

The examples below are intended to explain the invention without representing a limitation.

EXAMPLES

Example 1

33% of Timiron® Splendid Red (multilayer pigment based on mica platelets coated with $TiO_2$, $SiO_2$ and $TiO_2$ from Merck KGaA, Germany) in Cerdec frit 10049 (glass powder from Cerdec, Germany) after baking.
Coating formulation:

10 g of Cerdec frit 10049/screen-printing medium 80683 (binder comprising hydroxypropylcellulose ether in 2-ethoxyethanol and ethanol) from Cerdec, weight ratio 1:1, ground in a ball mill
2.5 g of Timiron® Splendid Red (multilayer pigment from Merck KGaA)
20 g of screen-printing medium 80683 printed on with 51T screen fabric, baked at 700° C./10 min

Example 2

33% of Timiron® Splendid Blue (multilayer pigment based on mica platelets with $TiO_2$, $SiO_2$ and $TiO_2$, from Merck KGaA) in Cerdec frit 10049 after baking
Coating formulation:

10 g of Cerdec frit 10049/screen-printing medium 80683, weight ratio 1:1, ground in a ball mill
2.5 g of Timiron® Splendid Blue (multilayer pigment from Merck KGaA)
20 g of screen-printing medium 80683 printed on with 51T screen fabric, baked at 700° C./10 min

Example 3

33% of Timiron® Splendid Red/Timiron® Splendid Blue (multilayer pigments from Merck KGaA, ratio 3:1) in Cerdec frit 10049 after baking
Coating formulation:

10 g of Cerdec frit 10049/screen-printing medium 80683, weight ratio 1:1, ground in a ball mill
2.5 g of Timiron® Splendid Red/Timiron® Splendid Blue (multilayer pigments from Merck KGaA), ratio 3:1
20 g of screen-printing medium 80683 printed on with 51T screen fabric, baked at 700° C./10 min

Example 4

25% of $SiO_2$ platelets having a particle size of 5–40 µm coated with $(Sn,Sb)O_2$ and subsequently with $TiO_2$ in Cerdec frit 10049 after baking
Coating formulation:

15 g of Cerdec frit 10049/screen-printing medium 80683, weight ratio 1:1, ground in a ball mill 2.5 g of SiO$_2$ platelets having a particle size of 5–40 μm coated with (Sn,Sb)O$_2$ and subsequently with TiO$_2$ 30 g of screen-printing medium 80683 printed on with 51T screen fabric, baked at 700° C./10 min Example 5

25% of Al$_2$O$_3$ platelets having a particle size of from 10 to 60 μm coated with (Sn,Sb)O$_2$ and subsequently with SiO$_2$ and TiO$_2$ in Cerdec frit 10049 after baking Coating formulation:

15 g of Cerdec frit 10049/screen-printing medium 80683, weight ratio 1:1, ground in a ball mill 2.5 g of Al$_2$O$_3$ platelets having a particle size of from 10 to 60 μm coated with (Sn,Sb)O$_2$ and subsequently with SiO$_2$ and TiO$_2$ 30 g of screen-printing medium 80683 printed on with 51T screen fabric, baked at 700° C./10 min Comparative Example Single-layer Pigment 33% of Iriodin® 219 (single-layer pigment based on mica platelets coated with TiO$_2$ (rutile) from Merck KGaA) in Cerdec frit 10049 after baking Coating Formulation:

10 g of Cerdec frit 10049 screen-printing medium 80683, weight ratio 1:1, ground in a ball mill 2.5 g of Iriodin® 219 (single-layer pigment from Merck KGAA)

20 g of screen-printing medium 80683 printed on with 51T screen fabric, baked at 700° C./10 min For Timiron® Splendid Red (Example 1), the VIS transmission maximum is shifted to shorter wavelengths by 40 nm when the angle of incidence is changed from 8° to 60°, while this shift is only 13 nm for Iriodin® 219.

Example 6

Coating System

90% by weight of Hydroglasur BG/S colourless (water-borne coating from Ernst Diegel GmbH)

10% by weight of Timiron® Splendid Red

Coating by Spraying

Predrying for 5 min at 80° C.

Baking for 20 min at 180° C.

What is claimed is:

1. Transparent medium comprising at least one multilayer pigment, which pigment comprises a platelet-form substrate with at least three layers thereon, provided such that the medium has angle-selective reflection or transmission properties and/or absorption properties whereby the ratio between the degree of solar transmission at an angle of incidence of solar radiation from 55 to 70° and the degree of solar transmission at an angle of incidence of solar radiation from 5 to 20° is in the range from 10 to 60.

2. Transparent medium according to claim 1, wherein the content of multilayer pigments having angle-selective transmission and reflection properties is from 5 to 70% by weight.

3. Transparent medium according to claim 1, wherein the multilayer pigment has one of the following structures:

Substrate+Fe$_2$O$_3$+SiO$_2$+Fe$_2$O$_3$;
Substrate+Fe$_2$O$_3$+SiO$_2$+TiO$_2$;
Substrate+TiO$_2$+SiO$_2$+Fe$_2$O$_3$;
Substrate+TiO$_2$+SiO$_2$+TiO$_2$/Fe$_2$O$_3$;
Substrate+TiO$_2$/Fe$_2$O$_3$+SiO$_2$+TiO$_2$/Fe$_2$O$_3$;
Substrate+TiO$_2$+SiO$_2$+Cr$_2$O$_3$;
Substrate+TiO$_2$+SiO$_2$+TiO$_2$;
Substrate+TiO$_2$+SiO$_2$+TiO$_2$+SiO$_2$;
Substrate+TiO$_2$+TiO$_2$/Fe$_2$O$_3$+SiO$_2$+TiO$_2$+TiO$_2$/Fe$_2$O$_3$;
Substrate+SnO$_2$+Ag+NiCrO$_x$+SnO$_2$;
Substrate+TiO$_2$+ZnO+Ag+NiCrO$_x$+Si$_3$N$_4$;
Substrate+TiO$_2$+SiO$_2$+TiO$_2$+FeTiO$_3$;
Substrate+TiO$_2$+SiO$_2$+FeTiO$_3$;
Substrate+TiO$_2$+FeTiO$_3$+SiO$_2$+TiO$_2$+FeTiO$_3$; and
Substrate+TiO$_2$+FeTiO$_3$+SiO$_2$+FeTiO$_3$.

4. Transparent medium according to claim 1, wherein the medium is a paint, a water-borne coating, a plastic, or a ceramic or glass frit.

5. Transparent medium according to claim 1, wherein the transparent medium is embossed or structured to orient the multilayer pigment.

6. Transparent thermal insulation system comprising colored absorber layers in combination with a coated glass which shades in an angle-selective manner, wherein the glass has been coated with a transparent medium according to claim 1.

7. A method comprising coating a glass, ceramic, aluminum sheeting, steel sheeting, embossing film or building wall with a transparent medium according to claim 1 to provide angle-selective reflection or transmission properties and/or absorption properties.

8. Transparent medium according to claim 1, wherein the multilayer pigment comprises the substrate and at least three layers of metal oxides, rare-earth metal sulfides, oxysulfides and/or metal sulfides.

9. Transparent medium according to claim 1, wherein the substrate for the multilayer pigment is synthetic or natural mica, SiO$_2$, glass, TiO$_2$, graphite or Al$_2$O$_3$ platelets.

10. Transparent medium according to claim 8, wherein the layers of the multilayer pigment consist of alternating layers of high and low refractive index.

11. Transparent medium according to claim 1, wherein the layers of the multilayer pigment are selected from titanium dioxide, zirconium oxide, zinc oxide, cerium oxide, Fe$_2$O$_3$, Fe$_3$O$_4$, an iron/titanium oxide, chromium oxide, BiOCl, FeO(OH), a spinel, a titanate, an aluminate, a chromate, a tungsten bronze, a tin oxide, a doped tin oxide, a nitride, SiO$_2$, Al$_2$O$_3$, MgF$_2$, an organic polymer, a zeolite, a borosilicate, a semitransparent layer of a Cr, Ti, Mo, W, Al, Cu, Ag, Au or Ni metal or mixtures thereof.

12. Transparent medium according to claim 1, wherein the ratio between the degree of solar transmission at an angle of incidence of solar radiation from 55 to 70° and the degree of solar transmission at an angle of incidence of solar radiation from 5 to 20° is in the range from 10 to less than 50%.

13. Transparent medium according to claim 1, wherein the ratio between the degree of solar transmission at an angle of incidence of solar radiation from 55 to 70° and the degree of solar transmission at an angle of incidence of solar radiation from 5 to 20° is in the range from 30 to less than 50%.

14. Transparent medium according to claim 1, wherein at least one layer of the multilayer pigment additionally comprises finely divided particles of TiO$_2$ or carbon black having a size in the range of 10–250 nm.

15. Transparent medium according to claim 1, wherein the medium contains at least two different multilayer pigments.

* * * * *